(12) United States Patent
Roeglinger et al.

(10) Patent No.: US 12,423,476 B2
(45) Date of Patent: Sep. 23, 2025

(54) SYSTEM AND METHOD FOR MEASUREMENT MANAGEMENT

(71) Applicant: Rohde & Schwarz GmbH & Co. KG, Munich (DE)

(72) Inventors: Sebastian Roeglinger, Pfaffenhofen (DE); Bjoern Schmid, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 191 days.

(21) Appl. No.: 18/056,959

(22) Filed: Nov. 18, 2022

(65) Prior Publication Data

US 2024/0169096 A1 May 23, 2024

(51) Int. Cl.
| | | |
|---|---|---|
| G06F 21/00 | (2013.01) | |
| G06F 21/64 | (2013.01) | |
| H04L 9/08 | (2006.01) | |

(52) U.S. Cl.
CPC ............ G06F 21/64 (2013.01); H04L 9/0866 (2013.01)

(58) Field of Classification Search
CPC ..... G06F 21/64; H04L 9/0866; H04L 9/0643; H04L 9/0897; G01R 31/2822; G01D 21/00

See application file for complete search history.

(56) References Cited

U.S. PATENT DOCUMENTS

| | | | |
|---|---|---|---|
| 10,797,873 B2 | 10/2020 | Reading et al. | |
| 2003/0005289 A1* | 1/2003 | Gougeon | G07F 7/1008 |
| | | | 713/171 |
| 2020/0084026 A1* | 3/2020 | Reading | H04L 9/3247 |
| 2020/0174995 A1* | 6/2020 | Fu | G06F 21/64 |
| 2021/0035016 A1* | 2/2021 | Dingal | G06N 3/08 |
| 2021/0083883 A1* | 3/2021 | Dittmann | H04L 67/10 |
| 2021/0165402 A1 | 6/2021 | Roeglinger | |
| 2023/0096457 A1* | 3/2023 | Wang | G06F 16/2365 |
| | | | 707/610 |
| 2023/0153231 A1* | 5/2023 | Schallenberg | G06F 11/3684 |
| | | | 714/38.1 |

* cited by examiner

*Primary Examiner* — Michael M Lee

(74) *Attorney, Agent, or Firm* — Studebaker Brackett PLLC

(57) ABSTRACT

A system for measurement management is configured to obtain a configuration set and an associated configuration unique identifier (UID). The system is also configured to obtain at least one measurement result and an associated result UID. A relation between the configuration UID and the result UID is determined, and the relation is stored.

13 Claims, 6 Drawing Sheets

SYSTEM AND METHOD FOR MEASUREMENT MANAGEMENT

FIELD OF THE INVENTION

The invention relates to a system for management of measurement results, e.g., collected by a radio frequency (RF) measurement device. In particular, efficiency of processing the results is increased and traceability is facilitated. The invention also relates to a corresponding method and computer program.

TECHNICAL BACKGROUND

Generally, distributed and/or network based data processing allows for convenient, mobile, and collaborated data management, especially for handling extremely large amounts of measurement data and information. This is beneficial, as measurement data from an RF measurement device or subsequently processed results can be accessed by a remote user and can be processed off-line. However, when reporting or displaying historical measurement data or results, it is difficult to record or proof, under which circumstances, regulations, and basic parameters these data and results have been obtained. Accordingly, there is a lack of an effective and traceable scheme for measurement data management.

SUMMARY OF THE INVENTION

Against this background, the object of the present invention is to provide a measurement system which facilitates efficient and traceable reporting of measurement results.

The invention is set out in the appended set of claims. The object is solved by the features of the independent claims. The dependent claims contain further developments.

A first aspect of the present invention provides a system for measurement management, wherein the system is configured to obtain a configuration set and an associated configuration unique identifier, UID; obtain at least one measurement result and an associated result UID; determine a relation between the configuration UID and the result UID; and store the relation.

This facilitates a traceable and legally binding way of reporting of historical measurement tasks. Historical measurement results can be displayed consistently with measurement settings. The historical measurement results e.g., can be re-analyzed or re-processed. The system also facilitates seamless cloud integration and online test result reporting of historical test and measurement tasks. The system also contributes to decreasing hardware utilization of actual measurement hardware. In other words, a holistic and future proof approach for test and measurement systems is provided, which reduces development complexity, improves development speed, integration of novel concepts, and building huge distributed systems.

In an implementation form of the first aspect, the configuration UID comprises a configuration checksum, and/or the result UID comprises a result checksum.

This is beneficial, as checksums facilitate consistency and comparability of configuration settings and measurement results.

In a further implementation form of the first aspect, the system is further configured to store a signing certificate; and sign the configuration UID based on the signing certificate and/or sign the result UID based on the signing certificate.

In particular, the signing certificate is stored in a secure module (e.g. smartcard, subscriber identity module (SIM) card) of the system. In particular, signing the configuration UID and/or the result UID can be performed by the secure module.

This ensures legally binding traceability of configuration sets and measurement results.

In a further implementation form of the first aspect, the system is further configured to obtain the configuration UID and/or the result UID based on at least one of: measurement device calibration data, metadata, environment data, device temperature, air moisture, a GNSS position and/or timestamp, user account information, devices used for a measurement task, device under test (DUT) classification and/or information.

This ensures that, by means of the UID or checksum, conditions during measurements can be verified.

In particular, the system is further configured to obtain the configuration UID and/or the result UID based on the result itself and relevant additional information to interpret the result.

In a further implementation form of the first aspect, the system is configured to create a report based on the configuration set, the at least one measurement result and the relation.

This is beneficial, as reports can be created for each measurement step. The reports in particular can be generated on any connected device (e.g., in a cloud device), while no extra load for a measurement device is created.

In a further implementation form of the first aspect, the system is further configured to verify consistency of the at least one measurement result based on the configuration UID.

This is beneficial in a legal use case of the system.

In a further implementation form of the first aspect, the system is a distributed system.

In particular, the distributed system is distributed across at least one of: a cloud device, an on-premises device, a server device, a desktop device, a rack mountable device, a handheld device, a full box, a tiny box, a customer PC, a tablet.

In particular, the distributed system is a distributed measurement system.

This ensures scalability and easy integration of future components.

A second aspect of the present invention provides a method for measurement management, wherein the method comprises the steps of obtaining, by a system, a configuration set and an associated configuration unique identifier, UID; obtaining, by the system at least one measurement result and an associated result UID; determining, by the system, a relation between the configuration UID and the result UID; and storing, by the system, the relation.

In an implementation form of the second aspect, the configuration UID comprises a configuration checksum, and/or the result UID comprises a result checksum.

In a further implementation form of the second aspect, the method further comprises the steps of storing, by the system 100, a signing certificate 203; and signing, by the system 100 the configuration UID 102 based on the signing certificate 203 and/or sign the result UID 104 based on the signing certificate 203.

In a further implementation form of the second aspect, the method further comprises the steps of obtaining, by the system, the configuration UID and/or the result UID based on at least one of: measurement device calibration data, metadata, environment data, device temperature, air moisture, a GNSS position and/or timestamp, user account information, devices used for a measurement task, device under test (DUT) classification and/or information.

In particular, the method further comprises obtaining the configuration UID and/or the result UID based on the result itself and relevant additional information to interpret the result.

In a further implementation form of the second aspect, the method further comprises the steps of creating, by the system, a report based on the configuration set, the at least one measurement result and the relation.

In a further implementation form of the second aspect, the method further comprises the steps of verifying, by the system, consistency of the at least one measurement result based on the configuration UID.

In a further implementation form of the second aspect, the system is a distributed system.

The second aspect and its implementation forms include the same advantages as the first aspect and its respective implementation forms.

A third aspect of the present disclosure provides a computer program comprising instructions which, when the program is executed by a computer, cause the computer to perform the method according to the second aspects or any of its implementation forms.

The third aspect includes the same advantages as the first aspect and its respective implementation forms.

An exemplary embodiment of the invention is now further explained with respect to the drawings by way of examples only, in which FIG. 1 shows a schematic view of a system according to an embodiment of the present invention;

DETAILED DESCRIPTION

Figure 1:
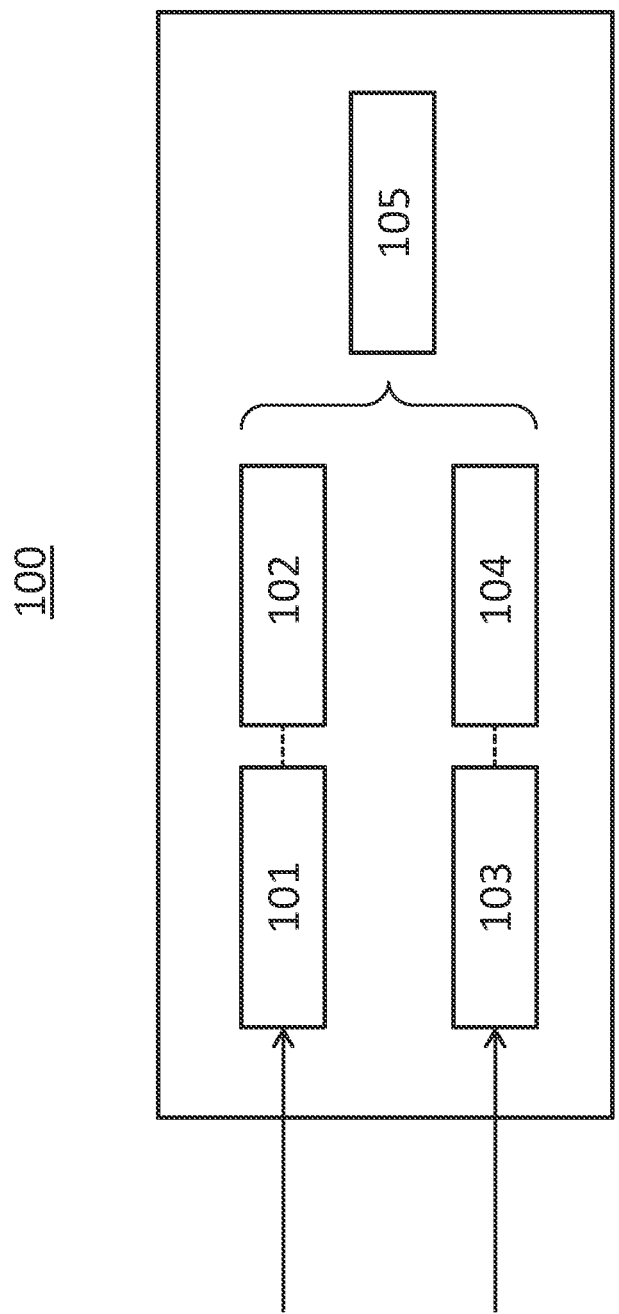

FIG. 1 shows a schematic illustration of a system 100 for measurement management. The system 100 is configured to obtain a configuration set 101 and an associated configuration unique identifier, UID 102. The configuration set 101 can comprise a measurement configuration, e.g., basics parameters for performing a measurement task. The configuration set 101 may e.g., be provided to the system 100 by a measurement device, for example an RF measurement device (oscilloscope, spectrum analyzer, power meter, IQ recorder, signal generator, etc.), a medical measurement device, a temperature gauge, an acoustic measurement device, a neutrino detector, a weather gauge, etc. The associated UID 102 facilitates identifying the configuration set 101.

The system is further configured to obtain at least one measurement result 103 and an associated result UID 104. The at least one measurement result 103 can be a measurement result obtained by an RF measurement device. This may include post processed raw values obtained from the RF measurement device. The associated UID 104 facilitates identifying the measurement result 103.

The system 100 further determines a relation 105 between the configuration UID 102 and the result UID 104 and stores the relation 105.

Thereby, the system ensures that for a measurement result 103 (identified by the result UID 104), a corresponding configuration set 101 (identified by the configuration UID 102) can be recalled, e.g., by evaluating the relation 105. This allows for traceable and legally binding measurement results 103.

The system 100 thus may display the measurement results 103 consistently with the configuration parameters (i.e., the configuration set 101) that were used for obtaining the results. This is possible, as the measurement results 103 and the configuration set 101 are linked via their corresponding UIDs. Consistency can be ensured, even if the RF measurement device which obtained the measurement results 103 is already doing a next measurement with a different configuration. According to FIG. 1, the RF measurement device is not comprised by the system 100. However, the RF measurement device may also be part of the system 100.

Figure 2:
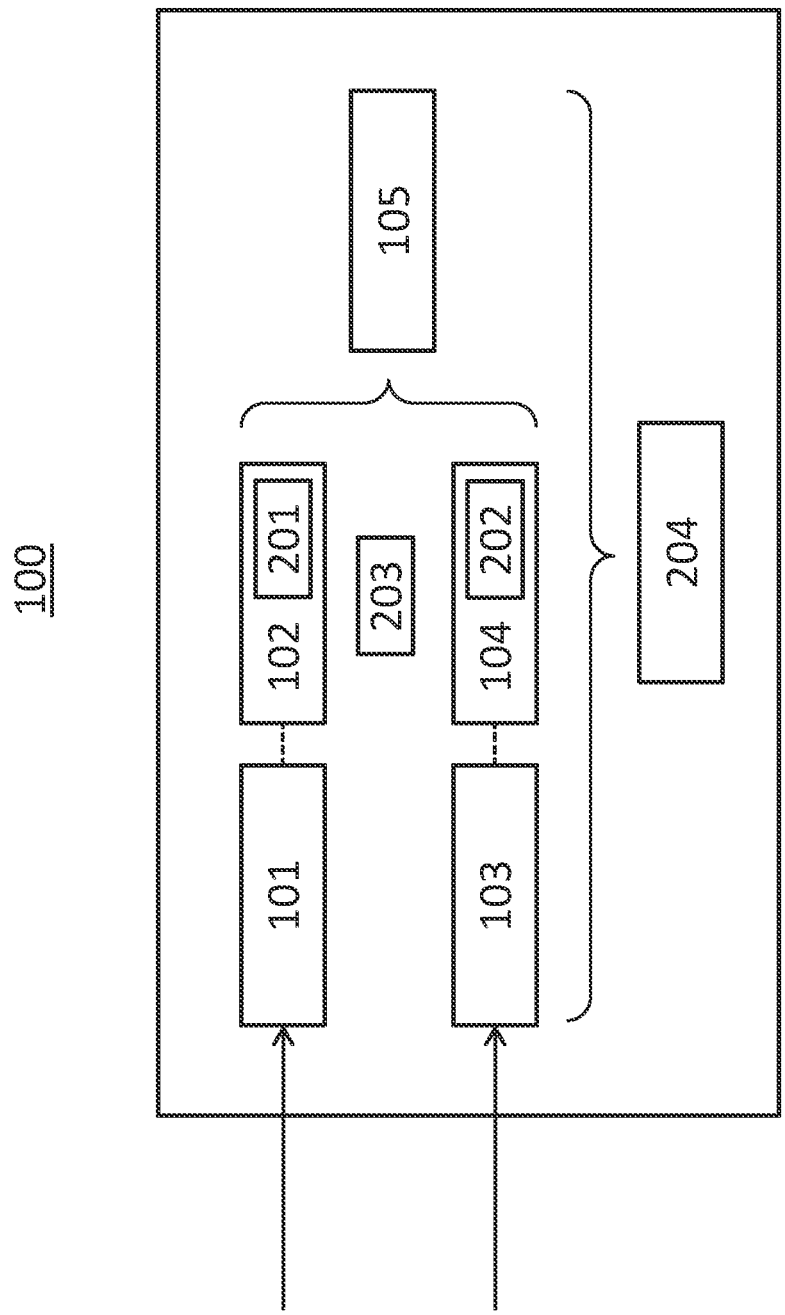
FIG. 2 shows a schematic view of a system according to an embodiment of the present invention in more detail.

The system 100 is now going to be described in more detail in view of FIG. 2. The system 100 of FIG. 2 includes all functions and features of the system 100 as described in view of FIG. 1.

As it is shown in FIG. 2, the configuration UID 102 optionally can comprise a configuration checksum 201. Alternatively, or additionally, the result UID 104 optionally can comprise a result checksum 202. The checksums 201, 202 e.g., can be calculated by a hash-algorithm. The checksums 201, 202 might be more complex to calculate but stay the same for any given configuration of the RF measurement device.

The checksums 201, 202 ensure legally binding and traceable signal acquisition, processing, and analyzing. In particular, the checksums 201, 202 can cover all steps from settings (i.e., configuration set 101) to final results (i.e., measurement results 103). If all checksums are done correctly, a traceable system that is legally binding can be implemented. Thus, measurements done in implementation and R&D can be re-used for qualification.

Further optionally, the configuration UID 102 and/or the result UID 104 (as well as the corresponding checksums 201, 202) can be obtained based on at least one of: measurement device calibration data, metadata, environment data, device temperature, air moisture, a GNSS position and/or timestamp, user account information, devices used for a measurement task, device under test, DUT, classification and/or information. Thereby, these basic parameters which were present during measurement, can be recalled once the measurement results are e.g., displayed or reported again.

In other words, checksums 201, 202 for measurement settings during multiple measurements ensure consistency regarding the measurement results, because it can be verified that the same settings are used throughout the measurement (e.g., even if the device was turned off between the measurements, or if a different measurement device is used). Further, different settings can be compared, as there is a trace of results and a link with a result and the corresponding settings.

For "legally binding" results, it is beneficial if it can be ensured that data is not manipulated. This protection against manipulation can be increased if a signing certificate 203 is used. As it is also illustrated in FIG. 2, the system 100 may further store a signing certificate 203. The signing certificate 203 can be used to sign the configuration UID 102 and/or sign the result UID 104, in particular if these comprise checksums 201, 202. The signing certificate 203 can be a device certificate, e.g., on a secure module of the system 100 to identify the system 100 and have full traceability. For example, stored information, such as database entries or parameters, can be signed using the signing certificate 203 stored on a secure module. In other words, the signing certificate 203 can be stored or aligned to the checksums. This allows for legally binding traceability. A checksum can be sent to the SIM card, which then calculates code for signing. For this case, the secure module can store a private key.

Further optionally, the system 100 may create a report 204 based on the configuration set 101, the at least one measurement result 103 and the relation 105. Thereby, the report precisely reflects the circumstances (i.e., the configuration of an RF measurement device) which were present when the measurement result 103 was obtained.

For example, the report 204 can be created for each measurement result 103 in the past. A report 204 can be generated on any connected device or cloud, which is part of the system 100. Thus, no extra CPU load is generated for an RF measurement device. A protocol tester may perform an activation before a test is done.

For example, all information relating to a test or measurement action (configuration set 101, configuration UID 102, at least one measurement result 103, result UID 104) can be stored in the system 100 and the report 204 can be done at any time. All stored information can be processed to see if a particular RF measurement device has a problem, and for example not the tested device under test (DUT). Having the checksums also can ensure that all measurements in the report 204 were done the same way. A measurement task can e.g., be done again with the same firmware, to verify the results.

As all information, which is present during a test or measurement action, is stored within the checksums 201, 202, and can be aligned by the checksums 201, 202 the report can be generated e.g., in a cloud device and there is no need for the measurement device to display a configuration or a result. For a certain test case, a test report can ensure that things are set up correctly in an RF measurement device. By the checksum it can be checked that all such measurements in the report had same user settings to ensure that a test was done correctly.

In other words and further optionally, the system 100 can verify consistency of the at least one measurement result 103 based on the configuration UID 102.

Moreover, the system 100 can be a distributed system. For example, at least one of: a cloud device, an on-premises device, a server device, a desktop device, a rack mountable device, a handheld device, a full box, a tiny boxes, a customer PC, a tablet can be used to realize the system 100. Thus, the system 100 can scale up and down easily during operation. This also makes it easy to integrate novel test and measurement components in future.

In a distributed systems, settings and actions can be checked for consistency and can be used with simple measurement front ends. Also, a business logic can be moved to a cloud device. In a distributed system, an RF measurement device may just receive a hardware config (i.e. the configuration set 101), and links it to results (the measurement result 103). The RF measurement device may just have a HW module (such as an FPGA, an ASIC, a shifting register, or a configurable IC) and have the settings transferred to the HW module. The HW module may take the measurement and send just the checksum back. And during the measurement, the next settings and checksum can be sent. Thus, timing can be less relied on. The HW module can perform measurements whenever possible, or on an asynchronous basis. In a distributed system, a host PC may perform computation of settings and provide the settings and checksum. In case of a modular measurement device, there is no need for a high power capable CPU on a module. For handheld devices or probes it could be beneficial to reduce power consumption by avoiding components like a CPU. A reduced power consumption is beneficial because the CPU can be avoided, and power and interference can be saved, and heating up the DUT can be avoided. A front end could be just a HW module. This is faster, as the front end doesn't have to process SCPI commands.

Further optionally, there can be multiple hardware configurations for a single measurement (e.g., sweep, IQ captures, time domain records) performed by the system 100. There may be several checksums 201, 202 that can be toggled during a measurement task to implement the hardware configuration. Different checksum output can be created for different hardware configurations for a single measurement, and for different devices (e.g., low end versus high end).

In particular, a configuration set 101 (which can also be called measurement configuration or meas. object) can be the same across many different Vector Spectrum Analyzers, Vector Network Analyzers, or scopes (also Vector Signal Generators, but to a lesser extent).

Figure 3:
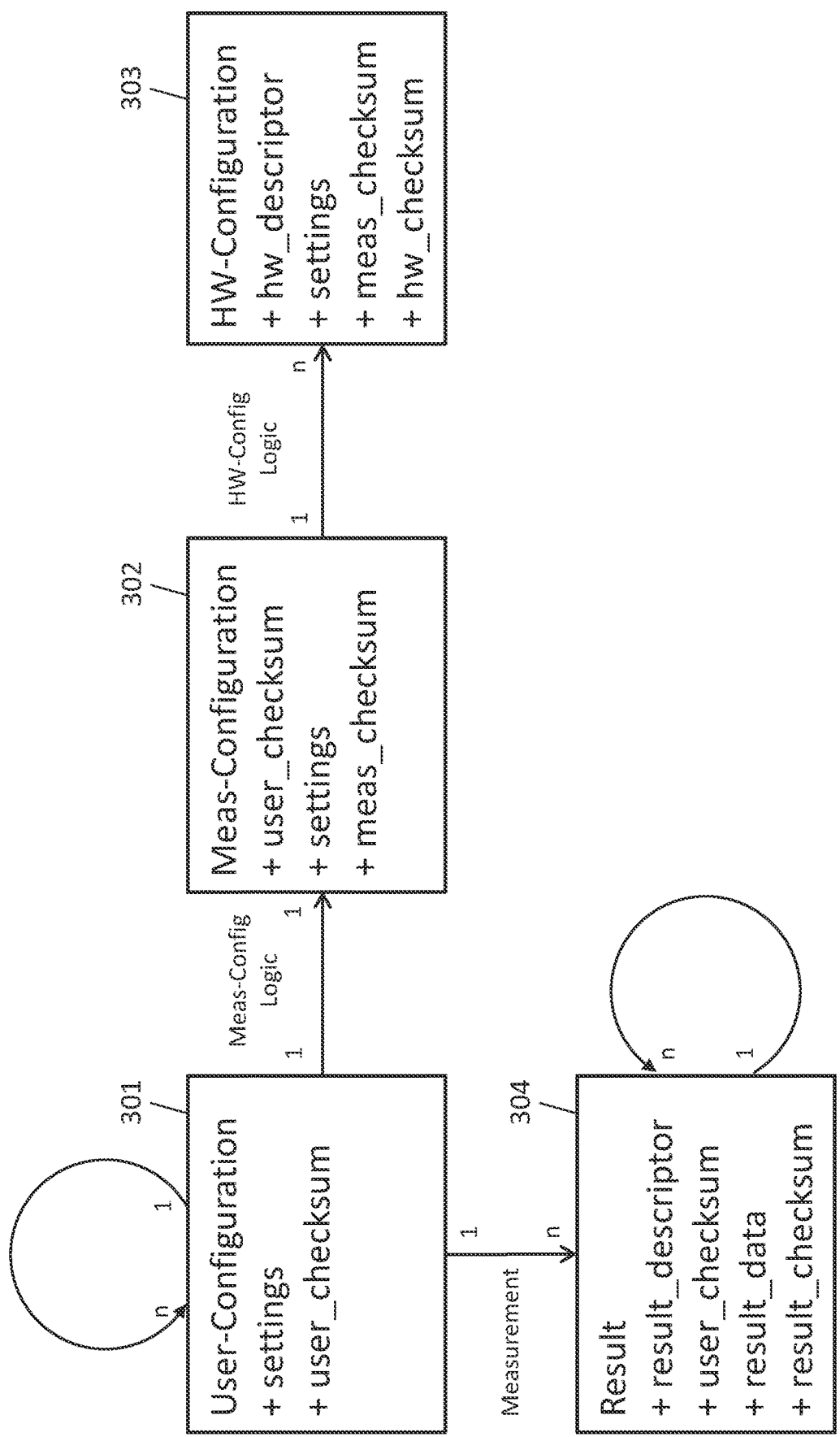
FIG. 3 shows a schematic view of configurations and results according to the present invention.

In particular, a checksum can also be calculated for a business logic (e.g., a Meas-ConFIG. Logic, or a HW-ConFIG. Logic DSP-Kernel in FIG. 3. Those business logic components can be store in the databases in FIG. 4). A name can e.g., be "high end FSW" v. 3.

In particular, the UIDs can be calculated and associated fast for the settings and the results. For different RF measurement devices, or measurements it can be quickly checked if the settings are the same. A user does not need to validate the device settings by remote configuration commands, e.g., via SCPI protocol (e.g., fetching settings parameters via SCPI queries). A user may just send the checksum.

FIG. 3 shows an example of configuration sets 101 and measurement results 103. In FIG. 3, the configuration sets 101 are labelled with reference signs 301, 302 and 303. The measurement results 103 are labelled with reference sign 304.

As illustrated, in a configuration set 101, a user-configuration 301 may comprise settings and a user_checksum. The user-configuration 301 may be associated with a meas-configuration 302 (that is, a measurement configuration) in a 1 to 1 relationship. The meas-configuration 302 may comprise a user_checksum, settings and a meas_checksum. The meas-configuration 302 may be associated with a HW-configuration 303 (that is, a hardware configuration) in a 1 to n relationship. The HW-configuration 303 in particular can be a hardware configuration 209. The HW-configuration 303 can comprise a hw_descriptor, settings, a meas_checksum and a hw_checksum.

The configuration set 101 (in particular the user-configuration 301) can be used to obtain a measurement result 103 (that, is the measurement result 304). The measurement result 304 may contain a result descriptor, a user_checksum, result_data, and a result_checksum. The transition from measurement result 304 to measurement result 304 uses DSP-Kernels (that is, digital signal processing) to determine new results from old result which are stored in the database 401 described in FIG. 4 below.

Figure 4:
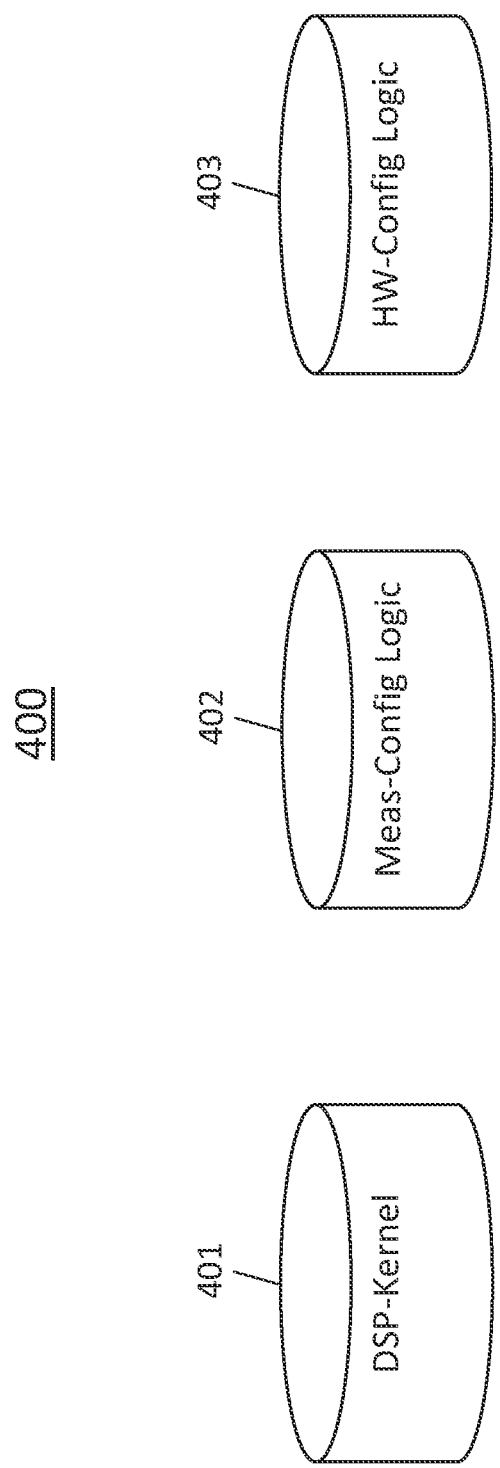
FIG. 4 shows a schematic view of repositories according to the present invention.

FIG. 4 shows repositories 400 for storing configuration sets 101. The repositories can e.g., comprise databases 401, 402, 403. For example, a repository may comprise at least one of: a DSP-kernel database 401, a meas-config logic database 402, a HW-config logic database 403.

Figure 5:
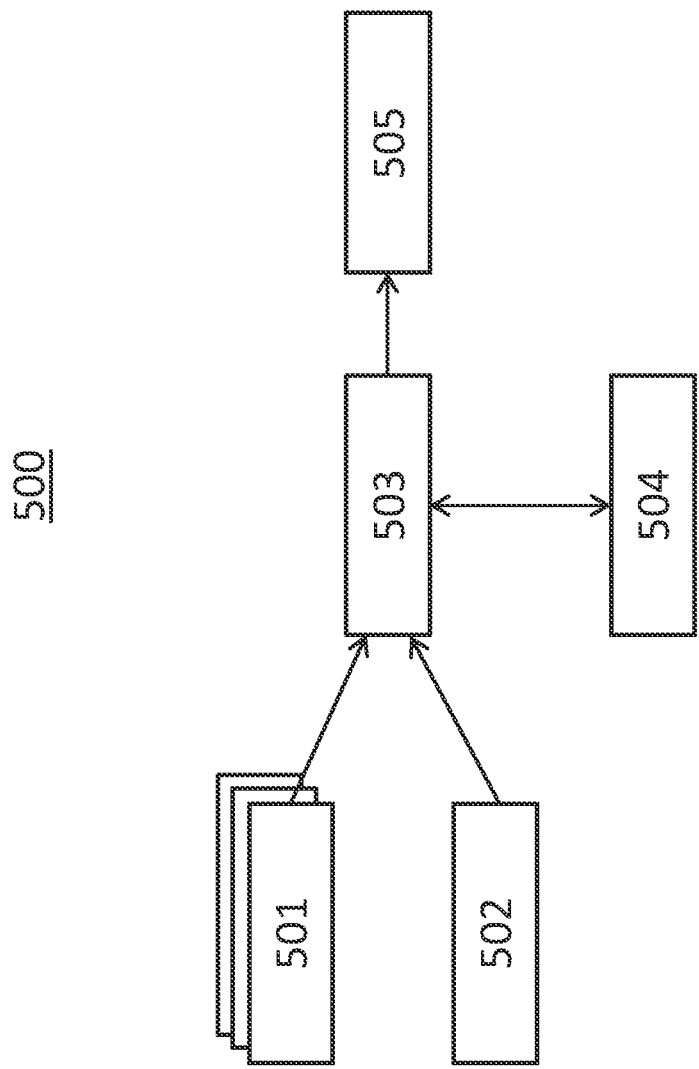
FIG. 5 shows a schematic view of obtaining a measurement result according to the present invention.

FIG. 5 shows how measurement 500 can be performed by the system 100. As illustrated, a number of n HW-configurations 501 and a meas-configuration 502 are input to a meas-sequencer 503. By using the meas-sequencer 503, measurements are performed by measurement hardware 504. The meas-sequencer 503 then outputs a measurement result 504, which is obtained based on the n HW-configurations 501, the meas-configuration 502 and the measurement hardware 504.

Figure 6:
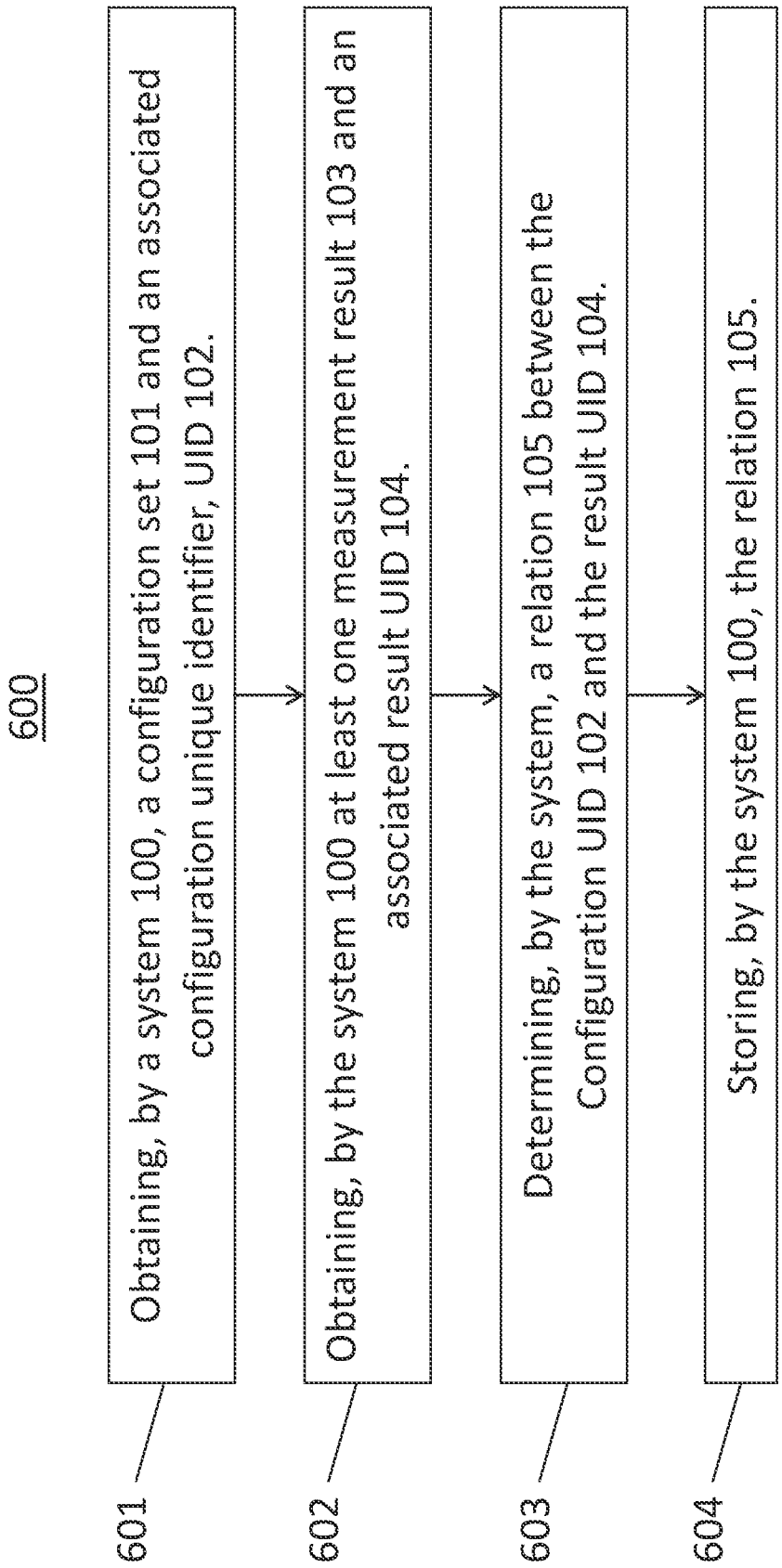
FIG. 6 shows a schematic view of a method according to an embodiment of the present invention.

FIG. 6 schematically shows a method 600 for measurement management. The method 600 comprises a first step of obtaining 601, by a system 100, a configuration set 101 and an associated configuration unique identifier, UID 102. The method comprises a second step of obtaining 602, by the system 100 at least one measurement result 103 and an associated result UID 104. The method 600 comprises a third step of determining 603, by the system, a relation 105 between the configuration UID 102 and the result UID 104. The method further comprises a fourth step of storing 604, by the system 100, the relation 105

It is important to note that the inventive device and method very closely correspond. Therefore, all the above said regarding the device is also applicable to the method. Everything which is described in the description and/or claimed in the claims and/or drawn in the drawings can be combined.

The invention is not limited to the illustrated embodiment. The network devices may be mobile terminals such as mobile phones, but also computers such as personal computers or the like. All features described above, or features shown in the figures can be combined with each other in any advantageous manner within the scope of the invention.

The invention claimed is:

1. A system for measurement management, wherein the system comprises a computer configured to:
    obtain a configuration set and an associated configuration unique identifier (UID);
    obtain at least one measurement result and an associated measurement result UID;
    determine a relation between the configuration UID and the measurement result UID;
    store the relation, in a manner enabling retrieval of historical measurement results in association with their configuration settings for subsequent analysis or processing;
    store a signing certificate in a secure module of the system; and
    sign the configuration UID based on the signing certificate or sign the measurement result UID based on the signing certificate, wherein the signing certificate is used to identify the system for traceability with the configuration UID or the measurement result UID.

2. The system according to claim 1, wherein the configuration UID comprises a configuration checksum, or wherein the measurement result UID comprises a result checksum.

3. The system according to claim 1, further configured to obtain the configuration UID or the measurement result UID based on at least one of: measurement device calibration data, metadata, environment data, device temperature, air moisture, a GNSS position, a timestamp, user account information, devices used for a measurement task, device under test (DUT) classification or information.

4. The system according to claim 1, further configured to create a report based on the configuration set, the at least one measurement result and the relation.

5. The system according to claim 1, further configured to verify consistency of the at least one measurement result based on the configuration UID.

6. The system according to claim 1, wherein the system is a distributed system.

7. A computer-implemented method for measurement management by a system, wherein the method comprises steps of:
    obtaining, by the system, a configuration set and an associated configuration unique identifier (UID);
    obtaining, by the system, at least one measurement result and an associated measurement result UID;
    determining, by the system, a relation between the configuration UID and the measurement result UID;
    storing, by the system, the relation, in a manner enabling retrieval of historical measurement results in association with their configuration settings for subsequent analysis or processing;
    storing, by the system, a signing certificate in a secure module of the system; and
    signing, by the system, the configuration UID based on the signing certificate or signing the measurement result UID based on the signing certificate, wherein the signing certificate is used to identify the system for traceability with the configuration UID or the measurement result UID.

8. The method according to claim 7, wherein the configuration UID comprises a configuration checksum, or wherein the measurement result UID comprises a result checksum.

9. The method according to claim 7, further comprising a step of obtaining, by the system, the configuration UID or the measurement result UID based on at least one of: measurement device calibration data, metadata, environment data, device temperature, air moisture, a GNSS position, a timestamp, user account information, devices used for a measurement task, device under test (DUT) classification or information.

10. The method according to claim 7, further comprising a step of creating, by the system, a report based on the configuration set, the at least one measurement result and the relation.

11. The method according to claim 7, further comprising a step of verifying, by the system, consistency of the at least one measurement result based on the configuration UID.

12. The method according to claim 7, wherein the system is a distributed system.

13. A non-transitory computer-readable storage medium storing instructions which, when executed by a computer of a system, cause the computer to carry out following steps:
    obtaining, by the system, a configuration set and an associated configuration unique identifier (UID);
    obtaining, by the system, at least one measurement result and an associated measurement result UID;
    determining, by the system, a relation between the configuration UID and the measurement result UID;
    storing, by the system, the relation, in a manner enabling retrieval of historical measurement results in association with their configuration settings for subsequent analysis or processing;
    storing, by the system, a signing certificate in a secure module of the system; and
    signing, by the system, the configuration UID based on the signing certificate or signing the measurement result UID based on the signing certificate, wherein the signing certificate is used to identify the system for traceability with the configuration UID or the measurement result UID.

\* \* \* \* \*